Dec. 12, 1961  KARL-HEINZ GINSBACH  3,012,305
ELECTRICALLY UNSYMMETRICALLY CONDUCTIVE SYSTEM
AND METHOD FOR PRODUCING SAME
Filed June 7, 1957  3 Sheets-Sheet 1

Inventor:
KARL-HEINZ GINSBACH
By Tautmin & Tautmin
Attorneys

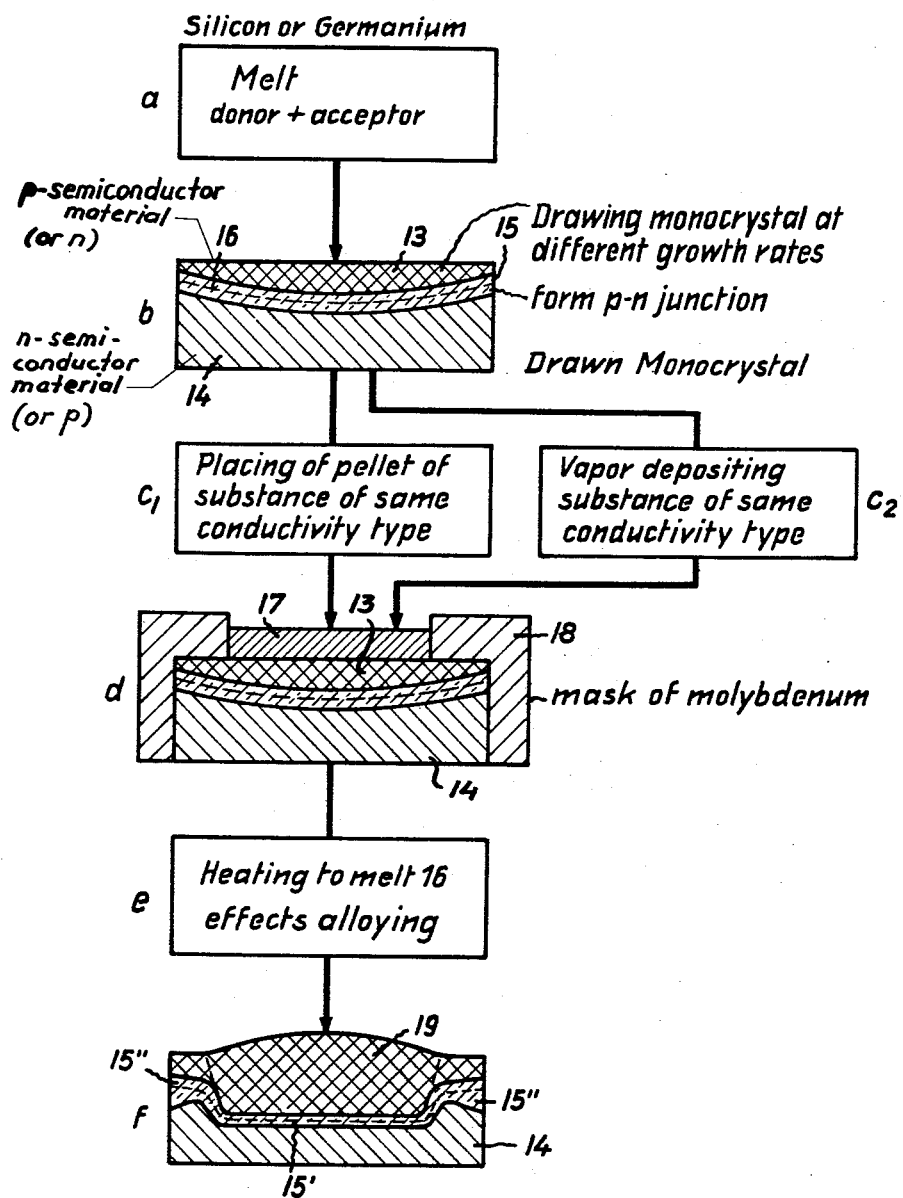

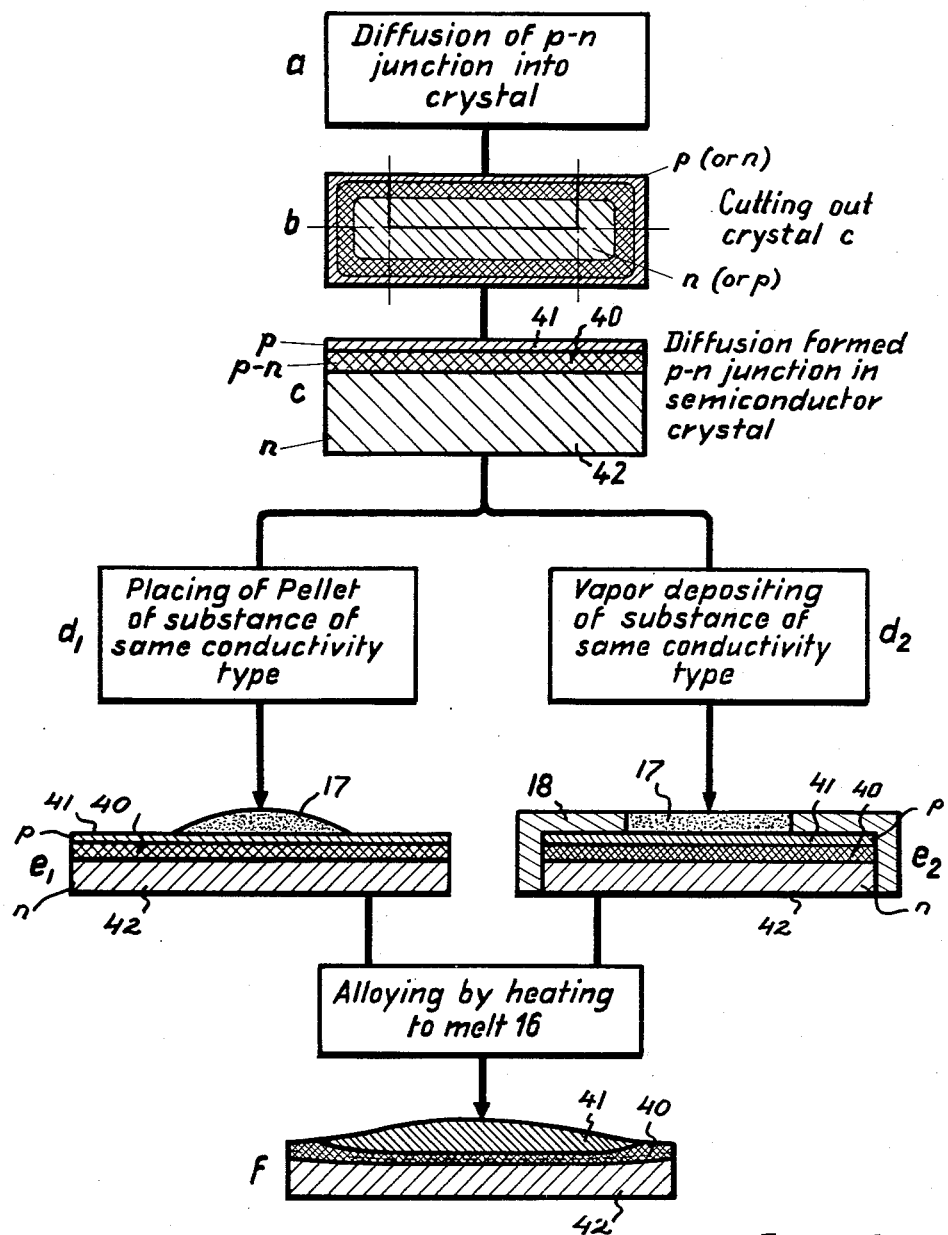

United States Patent Office 3,012,305
Patented Dec. 12, 1961

3,012,305
ELECTRICALLY UNSYMMETRICALLY CONDUCTIVE SYSTEM AND METHOD FOR PRODUCING SAME
Karl-Heinz Ginsbach, Warstein, Germany, assignor to Licentia Patent-Verwaltungs-G.m.b.H., Hamburg, Germany
Filed June 7, 1957, Ser. No. 664,358
Claims priority, application Germany June 7, 1956
7 Claims. (Cl. 29—25.3)

This invention relates to electrically unsymmetrically conductive systems and a method for producing the same. It relates more particularly to a new type of dry plate rectifier of semi-conductive material and a method for its manufacture.

It is an object of my invention to provide an electrically unsymmetrically conductive system which is particularly suitable for use as a dry plate rectifier for high power conversion and a method for its manufacture.

It is another object of my invention to provide an electrically semi-conductive system of the aforesaid type which is capable of supporting high barrier voltages without breakdown, while, at the same time, permitting the flow of high power currents through the system which thus serves as a rectifier.

Recently, the semi-conductive materials used in the art of manufacturing electrically unsymmetrically conductive systems, and in particular dry-plate rectifying devices, have been principally germanium, silicon, and intermetallic compounds between metals of the groups III and V of the periodic table.

These semi-conductive materials are distinguished from other semi-conductive substances such as selenium or cupreous oxide, by the fact that they can support much greater current loads and show substantially higher barrier potentials, and are therefore preferably employed in the construction of high power current rectifiers.

Particularly interesting in this respect are those substances in which the rectifying effect is achieved at a p-n junction provided in a monocrystal semi-conductor body.

An ideal high power current rectifier must preferably consist of a semi-conductor body having a p-n junction of the most favorable properties of a high current flow therethrough, and simultaneously have a very high barrier potential. Such semi-conductor bodies have thus far not been manufactured in the art.

One known process by means of which p-n junctions are obtained in semi-conductor monocrystals is that of growing them with the aid of a seed crystal from a melt. This process is described in detail in the British Patent 738,231 granted to General Electric Company and comprises adding to the melt of semi-conductor material certain "donors" and "acceptors" having different segregation coefficients. It is thus possible to obtain p-n junctions which, as experience has shown, are relatively gradual or "flat" and show high barrier potentials, but relatively unsatisfactory current flow properties, i.e. their resistivity is too high. This phenomenon is due to the "broad" character of the p-n junction having a "flat" gradient, which terms shall be explained hereinafter.

A second known process for obtaining p-n junctions is that of applying to the surface of a semi-conductor body a material of opposite conductivity type and heating this material and the adjacent zone of the semi-conductor body sufficiently to cause diffusion of charged particles of the material into the semi-conductor body. Again the resulting p-n junctions are broad ones, having a "flat" gradient from the center of the junction toward the adjacent zones of the semi-conductor body, and their properties are correspondingly very satisfactory with regard to their barrier potential, but unsatisfactory with regard to their high resistivity to heavy current loads.

The same diffusion effect may also be obtained by contacting a semi-conductor crystal with the gaseous phase of a substance imparting to the crystal an opposite conductivity type and heating so that diffusion takes place into the semi-conductor crystal directly from the gaseous phase. The resulting p-n junction suffers from the same drawbacks as when applying a coating according to the aforesaid second known process and thus causing diffusion by heating from a superimposed solid phase into the semi-conductor crystal.

It has been found that the barrier layer breaks down at a certain limit barrier voltage, preferably in the region where the p-n junction emerges at the crystal surface. It is believed that this is due to the fact that it is impossible to maintain this surface of the semi-conductor crystal entirely free from undesirable impurities. I have found that the "narrower" the p-n junction, the more sensitive it is against such impurities, and the more readily does it break down along the crystal surface.

In the German patent application No. 1,000,115 to K. O. Seiler issued January 3, 1957, it is already proposed to improve the resistance of p-n junctions to high barrier voltages in semi-conductor crystals in which these p-n junctions have been brought about by the above-described second or diffusion method and are, therefore, of the above-defined "broad" character having a "flat" impurity gradient. The improvement in the p-n junction is obtained by heating the semi-conductor crystal, preferably in its surface area about the p-n junction, either by a conventional tempering process or by high frequency heating.

The resulting semi-conductor crystals have a flattened gradient of their p-n junction in the vicinity of the crystal surface and are said to be particularly well suited as material for diodes.

However, since their p-n junction is usually too broad even in the interior of the semi-conductor crystal, the resulting semi-conductive system is still unsatisfactory when used as a dry plate rectifier, in particular due to the above-mentioned unsatisfactory current flow properties of broad p-n junctions.

On the other hand, it is very difficult to control the heat diffusion effect at the surface and particularly in the interior of crystals having p-n junctions during Seiler's tempering step. The narrower the p-n junction the more difficult is it to control this tempering step in spite of the complicated measures proposed by Seiler supra to effect a broadening of the near-surface portions of the p-n junction.

My invention avoids the above-described difficulties and drawbacks and attains the objects stated hereinbefore, by providing a new type of dry plate rectifying system and a novel process for manufacturing the same which combines the known method of obtaining narrow p-n junction having a steep gradient of impurity distribution of the opposite conductivity type, which method is known as "alloying method" and is, for instance, described in detail in U.S. Patent 2,725,315 granted to C. S. Fuller November 29, 1955, with other steps known per se which have also been described above.

Preferably and contrary to the methods hitherto proposed, I start with a crystal having an originally broad p-n junction and narrow this junction down in the interior of the crystal in a well controlled manner, while maintaining the original breadth of the p-n junction at the surface of the crystal and in the vicinity thereof.

This simple and easily controllable method permits to obtain a semi-conductive system which combines the advantageous features of firstly excellent current flow properties in the direction of the forward current, and a high barrier potential free from danger of causing breakdown of the p-n junction at the crystal surface.

The electrically unsymmetrically conductive system thus obtained as therefore particularly well suited for use as a high current load rectifier system.

It is an important feature of my invention that, in a preferred embodiment of the semi-conductive system according to the same, the p-n junction is made narrow over substantially the entire extension thereof except in a relatively small marginal portion which is retained at its original breadth, so as to obtain the necessary high current flow in the direction of the forward current.

The nature of my invention will be still better understood by description thereof hereinafter in connection with the accompanying drawings, in which FIGURE 1 illustrates graphically the gradient of impurity distribution of a uniform p-n junction in a conventional semi-conductor crystal;

FIGURE 6 ($a$ to $f$) illustrates, by way of example one mode of carrying out the process of making a semiconductor system according to the invention;

FIGURE 7 ($a$ to $f$) illustrates, by way of example another mode of carrying out the process of manufacturing a semi-conductor system according to the invention.

Figure 1:
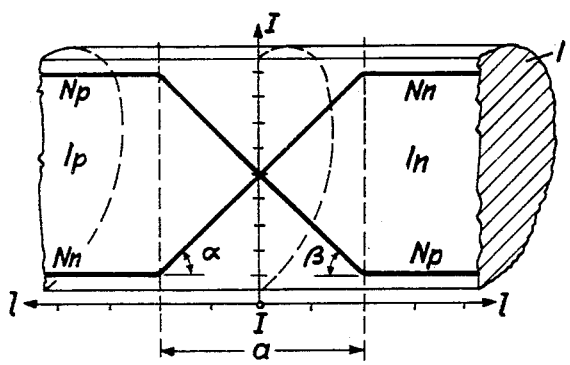

At the hand of FIGURE 1, there shall now be explained the terms of "flat" and "steep" gradient and "broad" and "narrow" p-n junction used hereinbefore.

In this figure, the semi-conductor crystal 1 consists of an n-conductivity type portion $1_n$ and a p-conductivity type portion $1_p$ which are ideally divided by the central plane J of the junction between both portions $1_n$ and $1_p$.

A coordinate system has been placed in the longitudinal central plane of the crystal 1, with the ordinate axis being located in the plane J of the p-n junction and being subdivided in units of concentration N of impurities being either donors or acceptors, i.e. contributing to imparting either n- or p-conductivity type to the crystal 1.

The abscissa is subdivided into units of length starting from the ordinate as O towards both ends of crystal 1.

In the n-conductive portion of the crystal, the concentration $N_n$ of donors is high while the concentration $N_p$ of acceptors is low, the excess of donors determining the conductivity type of this portion as $n$. From a certain region, $N_n$ decreases at a gradient characterized by $\alpha$ to a low level, while $N_p$ rises at a gradient $\beta$ to a high level, thereby reversing the conductivity type on the left side of J, in which the concentration of acceptors now exceeds that of donors.

Obviously, the steeper angles $\alpha$ and $\beta$, i.e. the gradients of concentrations of donors and acceptors, the narrower is the extension of the entire transition region $a$, which constitutes the p-n junction, and invertedly, the flatter these gradients, the broader is the junction.

Figure 2:
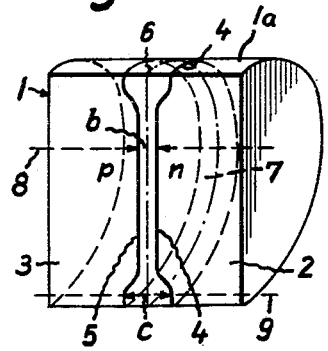
FIGURE 2 illustrates in perspective and partially sectional view a semi-conductive system having a p-n junction according to the invention.
Figure 3:
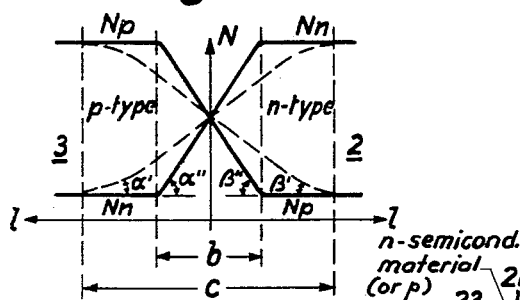
FIGURE 3 shows graphically the characteristics of the p-n junction in the interior and at the surface of the semi-conductive system of FIGURE 2.

The semi-conductive system of a dry plate rectifier illustrated schematically in the sectional view of FIGURE 2 comprises a semi-conductor crystal 1 which consists of an n-conductive portion 2 and a p-conductive portion 3, while the p-n junction extends between limits 4 and 5 and emerges at the surface $1a$ of crystal 1 in a belt zone whose central plane intersects surface $1a$ as indicated at 6. In the annular portion 7 of the p-n junction 4—5 in the immediate vicinity of the aforesaid belt zone the gradient of the concentration of impurities of either p- or n-type, as the case may be, is flatter as is indicated by angles $\alpha'$ and $\beta'$ in FIGURE 3, while, in the central portion of the p-n junction which extends over almost the entire cross sectional area of the crystal 1 in the plane 6, this gradient is steeper as indicated by angles $\alpha''$ and $\beta''$ in FIGURE 3.

Consequently, in its central portion, the p-n junction has a diameter $b$, while in the marginal portions thereof, its diameter is approximately $c$.

Figure 4:
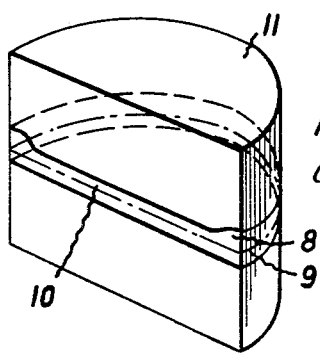
FIGURE 4 illustrates perspectively and partly in section another embodiment of a semi-conductive system according to the invention similar to that shown in FIGURE 2.

In the embodiment illustrated in FIGURE 4, the marginal zone 8 having a flat gradient of impurity concentration is unsymmetrically disposed relative to the central plane 9 of the p-n junction 10 tending through the semi-conductor crystal 11.

Figure 5:
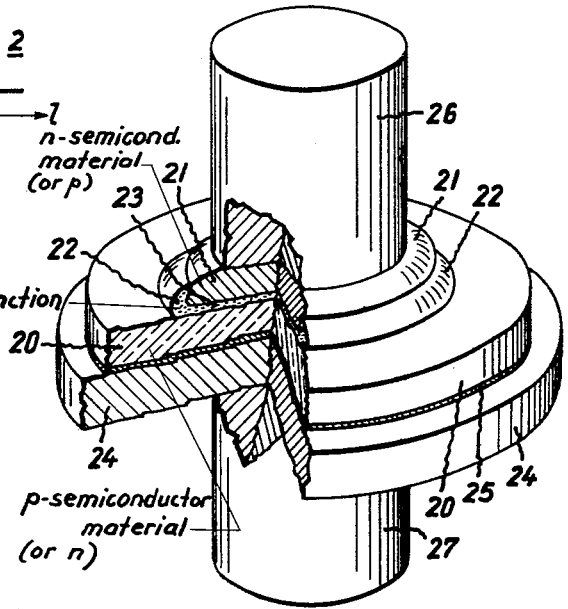
FIGURE 5 illustrates a dry plate rectifier comprising a semi-conductive system according to the invention.

In FIGURE 5 there is illustrated a dry plate rectifier system of the invention, which comprises a semi-conductor disc 20 of, for instance, p-type conductive germanium or silicon, an n-type semi-conductive alloy body 21 and therebetween a p-n junction which has a broad marginal portion 22 and a narrowed central portion 23.

The alloy body 21 consists of a portion of n-type germanium or silicon, containing gallium or indium or their intermetallic compounds such as gallium arsenide or indium antimonide, and/or alloyed with lithium, or tin or gold containing, for instance, antimony or arsenic. Elements of the third group of the periodic table, other than gallium or indium, namely boron, aluminum, and thallium are also suitable for forming the alloy layer 21 with n-type or p-type germanium or silicon, as shall be described hereinafter.

The dry plate rectifier system shown in FIGURE 5 further comprises a base plate 24 of preferably molybdenum on which the semi-conductor disc 20 is mounted free from barrier layers, for instance, with a solder layer 25 of tin, or tin-antimony or tin-indium, as the case may be. Electrode 26 of aluminum is welded to the top of alloy body 21, while electrode 27, for instance of copper, is welded to the molybdenum base plate 24.

A dry plate rectifier of this type is manufactured by the method according to the invention of which several modes are illustrated in FIGURES 6 and 7.

FIGURE 6 illustrates as a preferred mode of the method of making dry plate rectifier systems according to the invention, a step ($a$) of drawing from a melt of either germanium or silicon containing donor and acceptor substances, a monocrystal in which a relatively broad p-n junction is conventionally produced by changing at a determined time, the growth rate of the crystal. Thus, by altering the growth rate from, for instance, 1 millimeter per minute to 3 millimeters per minute and using gallium and arsenic or indium and antimony as impurities in the melt, the conductivity type of a drawn germanium monocrystal is changed from n-type to p-type conductivity, thus leading to a monocrystal as illustrated by ($b$) in FIGURE 6, which crystal consists of the p-type conductivity portion 13, the n-type conductivity portion 14, and the p-n junction 15 which is relatively broad on both sides of the central plane 16 thereof.

The p-n junction is slightly curved due to the drawing process. As a next step $c_1$, a pellet or small disc 17 is placed on top of one of the end surfaces of the monocrystal. This pellet is of a substance which imparts the same type of conductivity to the semi-conductor body, as prevails in the crystal portion on whose surface it is placed.

In FIGURE 6 ($c_1$) the pellet 17 is placed on the top surface of crystal portion 13 which is of p-type conductivity. Consequently, pellet 17 is of an element from the third group of the periodic table comprising boron (as a metalloid), and the metals aluminum, gallium, indium and thallium.

Instead of placing a pellet on portion 13, a layer of one of the aforesaid substances may be deposited on the surface of portion 13 from the vapor phase. (FIGURE 6 ($c_2$)). That part of the crystal surface which is not to be coated, is preferably covered by a mask 18 (FIGURE 6 (d)).

Thereafter, as step (e) in FIGURE 6, the entire system of FIGURE 6 (d) is heated in an inert atmosphere, for instance of argon or another suitable gas, during a few seconds to a temperature above 500° C. so as to melt the pellet 17 and alloy the same with the p-conductive portion 13 of the semi-conductor monocrystal. During this alloying step p-conductivity type impurities penetrate into the barrier layer zone and reduce the width of the p-n junction to a range of 1 micron and less, down to about 0.1 micron. This narrowing of the p-n junction zone is due to the alloying melting of the p-conductive crystal portion 13 down into the zone of the p-n junction 15 in that part of portion 13 which lies below pellet 17. Pellet 17 and portion 13 are thus fused together to form a combined p-conductive portion 19, and a semi-conductive system as illustrated in FIGURE 6 (f) is obtained. In this final system, the p-n junction is narrowed in its central portion 15' but broad in its marginal portion 15".

According to a second mode of operation a given conductivity type semi-conductor crystal of silicon, germanium, or an intermetallic compound of a metal of the third subgroup with a metal of the fifth subgroup of the periodic table, is provided with a p-n junction by the heat diffusion known per se (FIGURE 7a and b). A semi-conductor block (FIGURE 7c) comprising a p-n junction 40, a p-conductive layer 41 and an n-conductive crystal portion 42 is then cut out of the diffusion treated semi-conductor body shown in FIGURE 7b.

Subsequently, the diffusion produced p-n junction of this block is narrowed over its entire area with the exception of its marginal portions, in the same manner as is described hereinbefore in connection with FIGURES 6($c_1$), ($c_2$) etc.

A pellet is placed on that surface of the block, next to which there is located the p-n junction, and is alloyed thereto in the above-described manner, or a layer of 1a corresponding substance is vapor-deposited on that surface and heat alloyed thereto (FIGURE 7(d, e,) or ($d_2$, $e_2$)).

The resulting semi-conductor system (FIGURE 7f) is similar to that shown in FIGURE 6f.

The first described mode of operation (FIGURE 6(a, b, $c_1$, d, e, f)) is the preferred mode because it is the best mode of controlling the final thickness of the p-n junction in the area of narrowed diameter.

My invention shall be further illustrated by a number of examples describing how the same can be carried out in practice, which examples shall, however, be considered in no way as limitative thereof.

*Example I*

A monocrystal of germanium is drawn first at a growth rate of 1 millimeter per minute and then at 3 millimeters per minute from a melt containing germanium and, as impurity materials, gallium and arsenic. Thereby, the initially n-type conductive monocrystal changes its character to p-type conductivity. The crystal can be drawn, for instance, to a size of 0.5 millimeter thickness and 15 millimeters diameter.

A pellet of indium metal having a diameter of about 10 millimeters is then placed on the p-type germanium surface.

The system is then heated for 15 seconds under argon to about 500° C., i.e. below the melting point of germanium (936° C.). The p-n junction, whose initial thickness is approximately 1 to 10 microns, is narrowed in the area covered by the pellet to a thickness of, for instance, about 0.8 micron or less.

It is then mounted with its n-type germanium surface on a base plate of molybdenum of a somewhat larger diameter, for instance, of 20 millimeters, by means of a solder of pure tin, or tin and antimony, whereby formation of a barrier layer is avoided.

A copper electrode of about 8 millimeters diameter is then welded on to the molybdenum layer, and an aluminum wire of about the same diameter of 8 millimeters is welded on to the alloyed indium-p-type germanium surface of the semi-conductor system.

The dry plate rectifier thus obtained supports a current load of about 250 amperes per square centimeter and a barrier voltage of about 600 volts.

Comparable known semi-conductive systems comprising drawn germanium monocrystals support either barrier voltages up to 400 volts and very low current loads in the order of milliamperes up to a few amperes per $cm.^2$.

Dry plate rectifiers manufactured according to Example I and the following examples are particularly distinguished by their property of supporting increased pulse loads.

*Example II*

A germanium monocrystal of partly p-type and partly n-type conductivity and having a p-n junction intermediate these parts is prepared in the same manner as described in Example I, but mounted on the molybdenum base plate with its p-type conductivity surface instead of its n-type conductivity side, which mounting with the p-type conductivity surface to the molybdenum base plate is effected by means of an indium solder.

A pellet of tin containing about 0.5% of arsenic is used instead of the indium pellet described in Example I. Otherwise, the steps of Example I are followed.

*Example III*

A monocrystal of silicon is drawn first at a growth rate of 1.2 millimeters per minute, and then, after a given period, at the rate of 3.5 millimeters per minute from a melt containing silicon and, as impurity materials, lithium and an aluminum arsenic compound. The resulting semi-conductive crystal has a p-type conductivity portion, a p-n junction and an n-type conductivity portion, and may be grown, for instance, to a thickness of 0.25 mm. thick and of a diameter of 18 mm.

The crystal is then mounted with its p-side on a molybdenum base plate having a diameter of, for instance, 22 mm., with the aid of an indium tin alloy solder containing about 25% of indium.

A pellet having a diameter of about 12 mm. and consisting of tin containing about 0.5% of arsenic is then placed on the top surface of the n-type conductive silicon portion, and the system is then heated to 800° C. for about 10 seconds. The p-n junction is thereby narrowed in its central region to a width of about 1 micron.

An aluminum electrode is then welded to the alloyed side of the system, and a copper electrode to the molybdenum base plate. Both electrodes have diameters of about 10 mm.

The resulting electrically unsymmetrically conductive system can be used as a dry plate rectifier which withstands current loads of 300 amperes per $cm.^2$ and a barrier voltage of about 950 volts.

*Example IV*

A semi-conductive crystal is obtained by the steps described in Example III. Instead of mounting the crystal with its p-side on the molybdenum base plate, the crystal is mounted with its n-side on a molybdenum base plate having a diameter of, for instance, 22 mm., with the aid of a tin arsenic alloy solder containing about 0.5% of arsenic.

A pellet having a diameter of about 12 mm. and consisting of aluminum containing approximately 50% of indium is then placed on the top surface of the p-type conductive silicon portion. All other steps are the same as described in Example III.

Example V

A p-type conductive germanium disc having a thickness of about 0.5 mm. and a diameter of about 14 mm., and whose resistivity is about 1 ohm centimeter is blanched and then covered with a molybdenum mask which leaves a circular surface portion of one flat side of the disc free; the diameter of the free surface is about 11 mm. A lithium metal layer having a thickness of 0.1 mm. is then vapor deposited in vacuum on to this free portion of the disc surface.

The system is then heated in a helium atmosphere for about 10 seconds to about 700° C. whereby a p-n junction is formed at a depth of about 0.1 mm. below the lithium coated surface.

Lithium-germanium alloy which may have formed during the heating step as well as excessive lithium are then removed mechanically.

The semi-conductive system according to the invention is then produced by again covering the surface into which the p-n junction has been diffused, with a molybdenum mask having a central opening of 10 mm. diameter, and vapor depositing thereinto a layer of tin-antimony alloy containing about 0.5% of antimony, which layer is about 1.2 mm. thick.

The alloying step is then carried out by heating the system to about 500° C. for 15 seconds in an argon atmosphere. The p-n junction is narrowed in the area registering with the tin antimony deposit to a thickness below 0.8 micron.

The p-type surface of the system is soldered to a molybdenum plate by means of indium.

The system is then electrolytically blanched in a 10% kalium hydroxide solution and then rinsed in distilled water.

The system is then converted to a dry plate rectifier by further steps described in Example I.

Example VI

A p-type conductivity silicon disc having a resistivity of 0.6 ohm cm., a thickness of 0.5 mm. and a diameter of 13 mm. is provided with a lithium metal layer on one side thereof in the same manner as described in the preceding example.

The lithium metal layer is about 0.1 mm. thick. By heat diffusion at 900° C. during about 5 seconds, a p-n junction is formed at a depth of approximately 0.5 mm. below the lithium bearing surface.

The further treatment is similar to that described in the preceding example. However, gold having an antimony content of about 5% is used as the alloying substance, and the alloying step is carried out during 8 seconds at a temperature of 800° C. The p-type surface is soldered to a molybdenum plate by an indium aluminum alloy containing about 50% of indium.

Example VII

A block of n-type conductive silicon having a resistivity of about 2 ohm-cm., is blanched in a conventional manner and then heated during 16 hours at 1200° C. in an inert atmosphere, for instance helium, containing about 1 percent by volume of boron triiodide $BI_3$ and having a pressure of about 300 Torr at 20° C.

The boron which is thereby heat diffused into the silicon disc, therein produces a p-n junction at a depth in the range of 0.025 cm. A disc-shaped section as illustrated in FIGURE 7b and having a thickness of 0.3 mm. is cut from the block.

In the manner described in Example V, an aluminum layer having a thickness of 0.1 mm. is then vapor deposited on the p-type conductive surface of the disc, whereupon the system is heated for about 7 seconds at 900° C. so as to alloy the aluminum and the p-type conductive boron-containing silicon.

The system may then be treated further as described in any one of the preceding examples.

Intermetallic compounds such as gallium phosphide, gallium arsenide, indium antimonide and others formed between elements of the third and fifth group of the periodic table, i.e. between the elements Al, Ga, In, Te on the one hand and the elements P, As, Sb, Bi on the other hand may also be provided with p-n junctions in a conventional manner and then subjected to the alloying treatment according to my invention, with suitable substances, in the manner described in the preceding examples.

It will be understood that this invention is susceptible to further modification and, accordingly, it is desired to comprehend such modifications within this invention as may fall within the scope of the appended claims.

What I claim is:

1. In the method described for producing an electrically unsymmetrically conductive system having a portion of a fusible semi-conductive material of p-type conductivity, a portion of the same material of n-type conductivity, and a p-n junction therebetween, the steps of alloying to the outer surface of one of said portions a fusible pellet comprising a substance, exhibiting the same conductivity type as that portion, said pellet being smaller in size than the area over which said p-n junction extends in said body; and of diffusing said substance into that portion of said p-n junction extending below said pellet only so as to reduce the thickness of the p-n junction below said pellet thus effecting only a limited area of said p-n junction.

2. A method for producing an electrically unsymmetrically conductive system comprising a body of semi-conductive material of a given type conductivity selected from the group consisting of silicon, germanium and fusible intermetallic compounds, which method comprises the steps of (a) producing a mono-crystal semi-conductive body having a p-n junction, said p-n junction thus having a given gradient of impurity concentrations of donors and acceptors changing substantially evenly in a direction vertically to the extension of the junction over the entire area of the latter, and (b) of causing impurities to diffuse into a central portion of said p-n junction so as to increase said gradient therein, while (c) preventing a change of said gradient in the remaining portion of said p-n junction.

3. The method producing a semi-conductor diode comprising the steps of (a) producing a semi-conductor body having two portions of opposite conductivity types and a p-n junction extending over the entire area between said portions, (b) applying to a limited surface area of one of said portions, which surface area is substantially parallel with said p-n junction, and smaller than the entire area of the latter, a material imparting to said semi-conductor body the same conductivity type as that of the body portion to a surface area of which said material is being applied, and (c) heating the body and material sufficiently to alloy the latter with the body portion to which it is applied and thereby to reduce the thickness of the p-n junction in a central area substantially equal in extension to said limited surface area.

4. A method for producing an electrically unsymmetrically conductive system capable of supporting high current loads at high barrier voltages, comprising the steps of producing in a semi-conductor body of n-type conductivity a portion of p-type conductivity and a p-n junction between said portion of p-type conductivity and the remaining portion of said n-type body by drawing a mono-crystal of silicon from a melt containing silicon and impurity material composed of lithium and an aluminum-arsenic compound and changing the growth rate thereof at a determined instant; placing a pellet of aluminum containing 50% of indium metal upon the surface of said p-type silicon portion, said pellet being smaller than said latter surface; heating said system under argon to a temperature below the melting point of silicon, thus causing alloying of said indium metal and that part of said p-type silicon portion underlying said pellet of indium and causing diffusion of said indium into a central portion of said p-n junction so as to reduce the thickness of the latter in the interior of the system while retaining the original thickness of the p-n junction in the remaining portion thereof; and mounting said body with said n-type silicon surface upon a molybdenum base plate by means of a tin arsenic alloy solder containing about 0.5% of arsenic.

5. A method for producing an electrically unsymmetrically conductive system capable of supporting high current loads at high barrier voltages, comprising the steps of blanching a block of n-type conductivity silicon, heating said block in helium containing 1% of boron triiodide thus causing the boron to be diffused into said block thereby forming a p-n junction, cutting a disc-shaped section from said block so as to expose said junction at the surface of said section, vapor depositing an aluminum layer upon a limited, circular central portion of the p-type conductivity surface of said disc while leaving uncovered a marginal portion of said p-type conductivity surface, heating said disc so as to alloy said aluminum and said p-type conductive boron-containing silicon so as to reduce the thickness of said p-n junction in the interior of the system below said central portion while retaining the original thickness of the p-n junction where the same emerges at the surface of the system and below said marginal portion, and mounting the system with its n-type surface on a molybdenum base plate by means of a tin solder containing about 0.5% of arsenic.

6. A method of producing a semiconductor diode comprising the steps of:
   (a) producing a p-n junction in imparting to a first portion a first impurity substance rendering said first portion p-type conductive and imparting to a second portion of said body, contiguous with said first portion thereof, a second impurity substance rendering said second portion n-type conductive, said p-n junction extending over the entire area between said portions;
   (b) applying to a limited central surface area of a selected one of said first and second portions, a material including a third substance imparting to said selected body portion the same conductivity type as is present therein, said limited surface area being smaller than the entire surface area of said selected body portion;
   (c) and causing said third substance to diffuse into a central portion of said p-n junction so as to reduce the thickness thereof in said central portion while the thickness of the remaining portion of said p-n junction remains substantially unaffected.

7. The method of producing a semiconductor diode comprising the steps of: producing a semiconductive disc having two portions of opposite conductivity types and a p-n junction extending over the entire area between said portions; covering said disc with a mask leaving free a limited central surface area pertaining to the surface of one of said disc portions; depositing a substance on said surface area left free by said mask, said substance imparting to said disc portion to which it is applied the same type of conductivity as already present therein; and heating said disc and causing said substance to diffuse into a central portion of said p-n junction so as to reduce the thickness thereof in said central portion while the thickness of the remaining portion of said p-n junction remains substantially unaffected thereby.

References Cited in the file of this patent

UNITED STATES PATENTS

| | | |
|---|---|---|
| 2,603,693 | Kircher | July 15, 1952 |
| 2,665,399 | Lingel | Jan. 5, 1954 |
| 2,697,269 | Fuller | Dec. 21, 1954 |
| 2,701,326 | Pfann et al. | Feb. 1, 1955 |
| 2,731,704 | Spanos | Jan. 24, 1956 |
| 2,751,528 | Burton | June 19, 1956 |
| 2,806,983 | Hall | Sept. 17, 1957 |